United States Patent
Seki et al.

(10) Patent No.: US 7,499,197 B2
(45) Date of Patent: Mar. 3, 2009

(54) IMAGE FORMING CONTROL APPARATUS, IMAGE FORMING CONTROL METHOD AND COMPUTER READABLE MEDIUM

(75) Inventors: Masao Seki, Kanagawa (JP); Toshio Koriyama, Kanagawa (JP); Ryouichi Satoh, Kanagawa (JP); Yuichi Nishikuni, Kanagawa (JP); Toshie Kobiyama, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 58 days.

(21) Appl. No.: 11/510,644

(22) Filed: Aug. 28, 2006

(65) Prior Publication Data

US 2007/0133058 A1 Jun. 14, 2007

(30) Foreign Application Priority Data

Dec. 12, 2005 (JP) ............................. 2005-357592
Jun. 2, 2006 (JP) ............................. 2006-154966

(51) Int. Cl.
*H04N 1/40* (2006.01)

(52) U.S. Cl. ...................... 358/3.01; 358/504; 358/521; 358/1.9; 358/518

(58) Field of Classification Search ................ 358/3.01, 358/521, 1.15, 504, 1.9, 518
See application file for complete search history.

(56) References Cited

U.S. PATENT DOCUMENTS 4,792,979 A * 12/1988 Nomura et al. ............. 382/169
5,414,538 A * 5/1995 Eschbach .................... 358/522
6,236,751 B1 * 5/2001 Farrell ........................ 382/168
6,824,240 B2 * 11/2004 Kusakabe et al. ............. 347/15
7,128,382 B2 * 10/2006 Velde .......................... 347/14
2005/0078140 A1 * 4/2005 Ono ............................. 347/19

FOREIGN PATENT DOCUMENTS

JP 2005-1099975 * 4/2005
JP A 2005-109975 4/2005

* cited by examiner

*Primary Examiner*—Kimberly A Williams
(74) *Attorney, Agent, or Firm*—Oliff & Berridge, PLC

(57) ABSTRACT

An image forming control apparatus includes: a gradation correction curve generator and a calibration data generator. The gradation correction curve generator generates a gradation correction curve based on a correspondence between an output instruction values each representing a density of an image to be formed by an image forming apparatus and actual density values each representing a density of the image formed by the image forming apparatus. The gradation correction curve represents a correspondence between predetermined standard density values and the output instruction values. When an output instruction value corresponding to a maximum standard density value is smaller than a maximum output instruction value, the calibration data generator corrects the gradation correction curve so that the output instruction value corresponding to the maximum standard density value coincides with the maximum output instruction value, and generates the calibration data based on the corrected gradation correction curve.

13 Claims, 4 Drawing Sheets

IMAGE FORMING CONTROL APPARATUS, IMAGE FORMING CONTROL METHOD AND COMPUTER READABLE MEDIUM

BACKGROUND

1. Technical Field

The present invention relates to an image forming control apparatus that performs a gradation correction process based on calibration data for adjusting a density of an image for an image forming apparatus, and an image forming control method and a computer readable medium.

2. Related Art

When an image forming apparatus, such as a copier or a printer, employs image data to form an image on a recording medium, such as paper, the image forming apparatus, based on output instruction values determined in accordance, for example, with pixel values accompanying the image data, adjusts a volume of a toner or a volume of an ink to be used in order to control the density of the image to be formed, and consequently forms the image of which a gradation is accordance with the image data, on the recording medium. In order for the image forming apparatus to perform such a control process, an image forming control apparatus, which is connected to the image forming apparatus, includes a conversion table that is based on a reference gradation characteristic that represents a correspondence between pixel values (input values) of the image data, and output instruction values for reproducing target values (standard density values) for a density of the image to be formed on recording media. The image forming control apparatus employs the conversion table to convert the input values of the image data into output instruction values corresponding to the standard density values. Then, the output instruction values obtained through the conversion are output to the image forming apparatus as density instructions for the image to be formed. Based on the output instruction values, the image forming apparatus adjusts the volume of the toner, for example, to be used to form the image having a standard density that is in accordance with the input values of the image data.

However, since generally the state of the image forming apparatus fluctuates, depending on the operating environment and time-transient changes, there is a case where, even though the conversion is employed, the density of an image actually formed on a recording medium deviates from the standard density. Therefore, a technique is provided whereby an image forming control apparatus employs calibration data to adjust the density. According to this technique, for example, the image forming apparatus obtains data concerning a correspondence between an output instruction value for an image forming apparatus and the density value of an image actually formed, and based on the data, generates calibration data that specifies a correspondence between the standard density value and the output instruction value. Then, a gradation correction is performed, and the output instruction values that have been obtained are corrected, based on the above described conversion table, by converting the input values of the image data. Thereafter, to adjust the volume of the toner for the image forming apparatus, the values obtained by correction are output as corrected instruction values. Through this processing, the image forming control apparatus ensures that the image forming apparatus forms an image in accordance with the print engine characteristic of the image forming apparatus for the generation of calibration data.

FIG. 4A is a schematic graph showing an example of a correction to be performed between an output instruction value and a density value of an image actually formed by an image forming apparatus. In this graph, the horizontal axis represents an output instruction value, which falls within a range of 0 to 255, and the vertical axis represents an actual density value. As indicated by a curve C11 in FIG. 4A, in the standard state of the image forming apparatus, actual density value Dm corresponds to the maximum output instruction value 255, and is regarded as the maximum standard density value. Further, a curve C12 in FIG. 4A represents a case wherein, relative to the same output instruction value, the image forming apparatus forms an image at a density greater than that in the standard state. In this case, when the image is formed at the maximum output instruction value of 255, the actual density value exceeds the maximum standard density value Dm.

In such a case, when an output instruction value Ye that is smaller than the maximum value 255 is output, an image can be formed at the maximum standard density value Dm. Therefore, based on a correspondence represented by a curve C12, the image forming control apparatus generates a gradation correction curve C13 shown in FIG. 4B, and generates calibration data based on this curve C13. For the calibration data, the maximum output instruction value 255 is converted into an output instruction Ye (<255) corresponding to the maximum standard density value Dm. As a result, in order to ensure the image forming apparatus in the standard state forms an image at the maximum standard density value Dm, the image forming control apparatus performs the gradation correction process to convert the output instruction value 255 to the output instruction Ye. Thus, a user can obtain an image formed at the maximum standard density value Dm.

SUMMARY

According to an aspect of the invention, there is provided an image forming control apparatus that performs gradation correction process to adjust a density of an image formed by the image forming apparatus. The image forming control apparatus includes: a gradation correction curve generator that generates a gradation correction curve based on a correspondence between an output instruction values each representing a density of an image to be formed by the image forming apparatus and actual density values each representing a density of the image formed by the image forming apparatus, the gradation correction curve representing a correspondence between predetermined standard density values and the output instruction values; and a calibration data generator that, when an output instruction value corresponding to a maximum value of the standard density values is smaller than a maximum value of the output instruction values in the gradation correction curve, corrects the gradation correction curve so that the output instruction value corresponding to the maximum value of the standard density values coincides with the maximum value of the output instruction values, and generates the calibration data based on the corrected gradation correction curve.

BRIEF DESCRIPTION OF THE DRAWINGS

Embodiment of the present invention will be described in detail based on the following figures, wherein.

DETAILED DESCRIPTION

Figure 1:
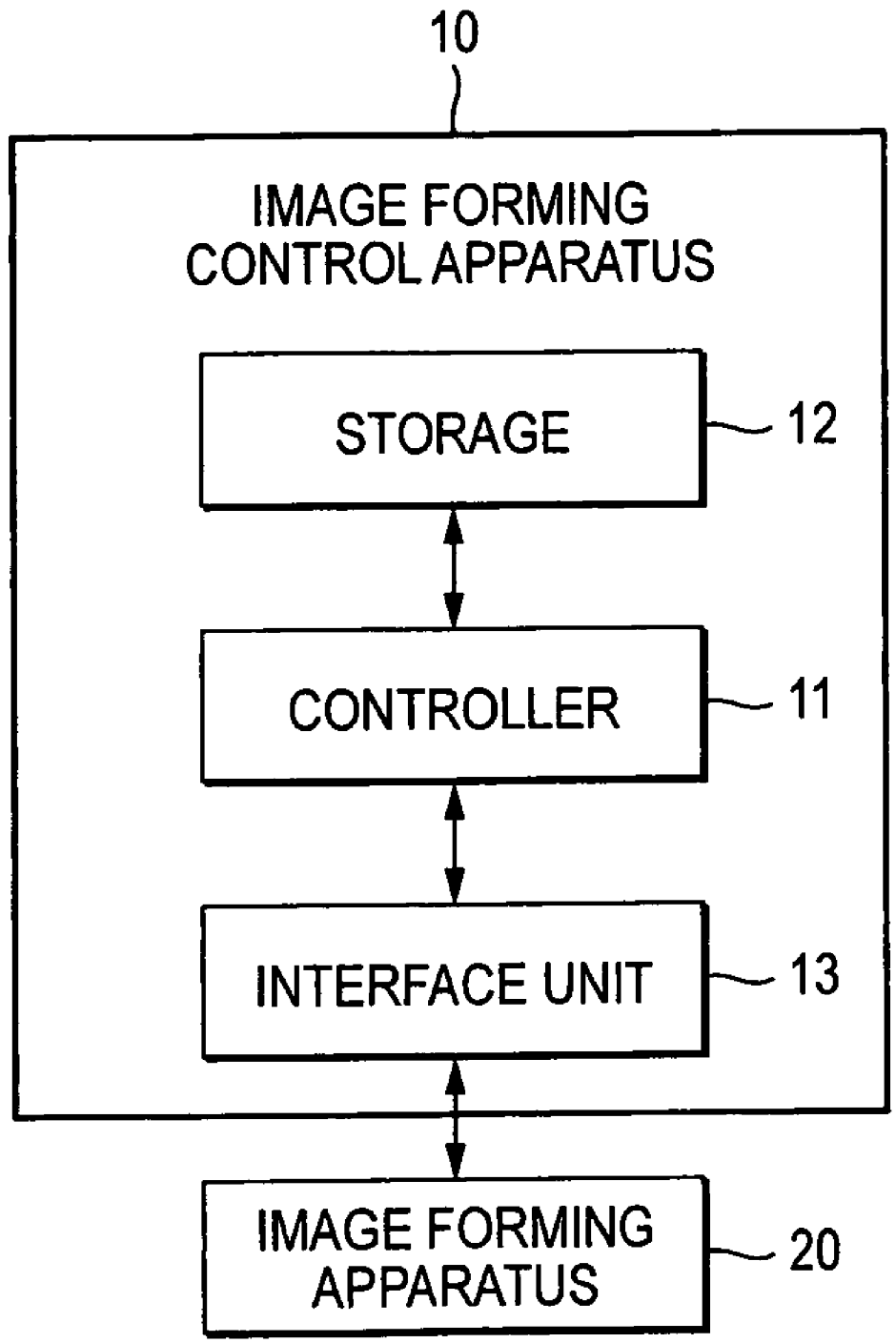
FIG. 1 is a schematic block diagram showing the configuration of an image forming control apparatus according to one embodiment of the present invention.

One embodiment of the present invention will now be described with reference to the drawings. In this embodiment, an image forming control apparatus 10 is a print server, for example, and includes, as shown in FIG. 1, a controller 11, a storage 12 and an interface unit 13. The image forming control apparatus 10 is connected to an image forming apparatus 20.

The controller 11 is a CPU, for example, and is operated in accordance with a program stored in the storage 12. The contents of a process performed by the controller 11 in this embodiment will be described later in detail.

The storage 12 is a storage medium readable by a computer in which a program to be performed by the controller 11 is stored, and includes at least one of a memory device, such as a RAM or a ROM, and a disk device. The storage 12 also serves as a work memory for the controller 11.

The interface unit 13 exchanges data with the image forming apparatus 20. Especially, image data, corrected by using calibration data, are output to the image forming apparatus 20 to initiate the forming of an image by the image forming apparatus 20.

The image forming apparatus 20 is a printer or a copier, for example, and forms an image on a recording medium under the control of the image forming control apparatus 10. In this embodiment, assume that the image forming apparatus 20 is an apparatus that forms an image using four color toners, i.e., cyan (C), magenta (M), yellow (Y) and black (K) toners.

The image forming control apparatus 10 may be integrally formed with the image forming apparatus 20. In such a case, all or part of the components of the image forming control apparatus 10 may be employed in common by the image forming apparatus 20, and the interface unit 13 may not be provided.

The image forming control apparatus 10 receives a user instruction and causes the image forming apparatus 20 to start image forming on a recording medium. Specifically, the controller 11 of the image forming control apparatus 10 obtains image data for image forming, and based on a predetermined conversion table (a color conversion profile) stored in the storage 12, converts the values of individual pixels accompanying the image data (for example, respective brightness values of RGB and the like) into CMYK output instruction values. In this case, the output instruction values, ranging from 0 to 255, are values used to designate, for the image forming apparatus 20, CMYK densities for an image to be formed. The output instruction values obtained by the conversion, based on the color conversion profile, correspond to the density values (standard density values) for an image formed by the image forming apparatus 20 in a predetermined standard state.

Further, the controller 11 performs the gradation correction process based on calibration data generated during a process that will be described later. Specifically, the controller 11 performs the conversion of the above described output instruction values by using calibration data stored in the storage 12, and obtains corrected output instruction values. Thereafter, the controller 11 outputs the corrected output instruction values through the interface unit 13 to the image forming apparatus 20 so that the image forming apparatus 20 can form an image at standard densities that are in accordance with the image data.

Figure 2:
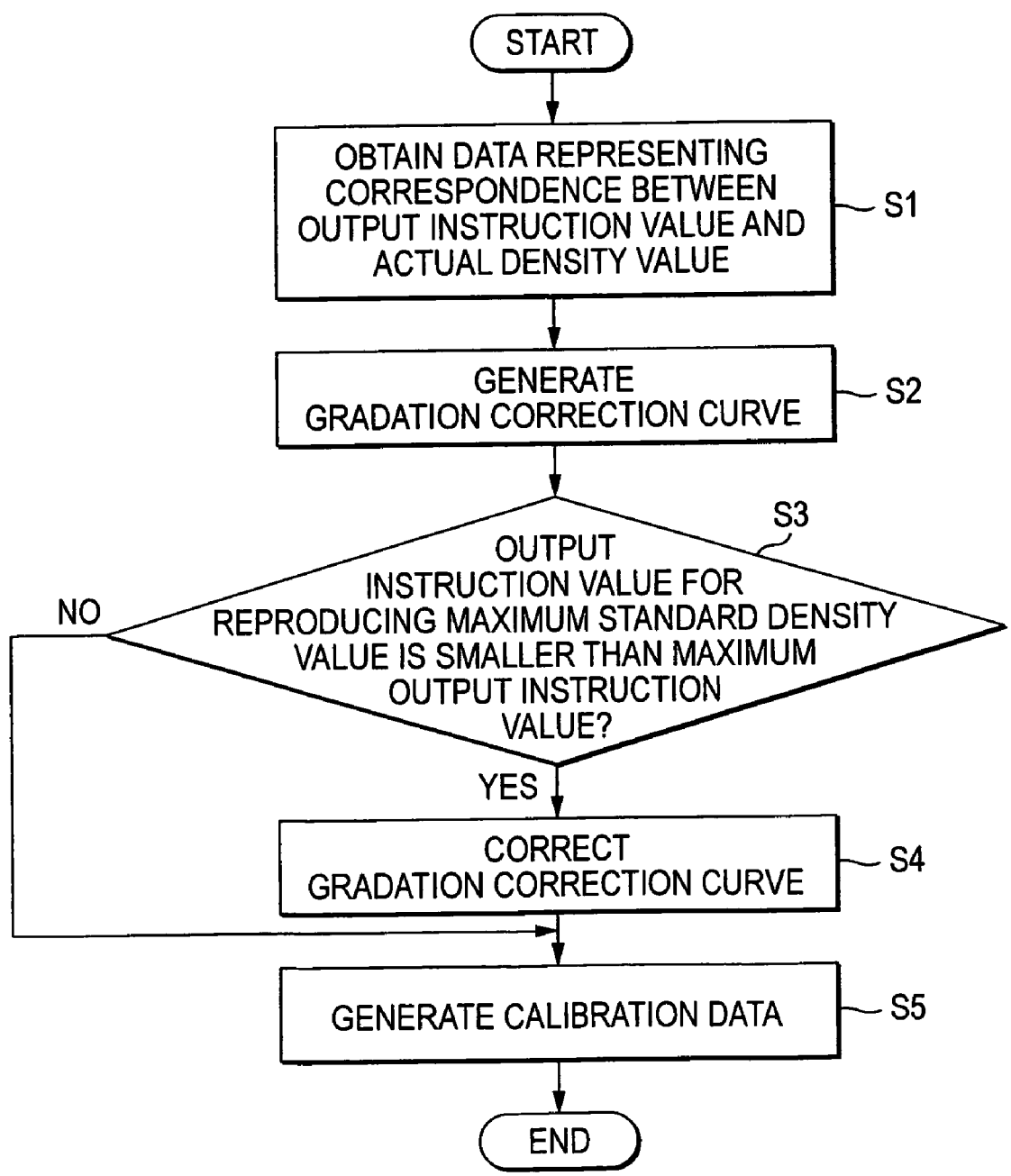
FIG. 2 is a flowchart showing an exemplary processing performed by the image forming control apparatus according to the embodiment of the invention.

The process performed by the controller 11 for generating the calibration data will now be explained with reference to the flowchart in FIG. 2.

First, the controller 11 obtains data representing a correspondence between output instruction values issued to the image forming apparatus 20 and density values for an image actually formed by the image forming apparatus 20 (S1). Specifically, the controller 11 employs the color conversion profile to convert predetermined reference image data into output instruction values corresponding to the standard density values, and outputs the thus obtained output instruction values to the image forming apparatus 20 for forming a patch chart on a recording medium. In this case, the reference image data is image data representing a patch chart that includes a predetermined gradation pattern for each of the CMYK color components. Then, when an image formed as a patch chart is read by a scanner or measured by a colorimeter, the values of the densities for the image formed as the patch chart are obtained. Through this process, the controller 11 can obtain data representing a correspondence between the output instruction values, according to the standard density values, and the density values of the image actually formed on the recording medium.

Following this, the controller 11 generates gradation tone curves based on the data obtained at S1 (S2). Specifically, based on the correspondence between the density values for the individual patches formed in the patch chart and the output instruction values, the controller 11 performs interpolation processes to the actual density values for the patches, and determines output instruction values to reproduce predetermined standard density values. Through this process, the controller 11 generates gradation correction curves, so that in the standard state, the output instruction values for reproducing the standard density values are converted into corrected output instruction values to be used to reproduce the standard density values at the time at which the data at step S1 were obtained.

Figure 3:
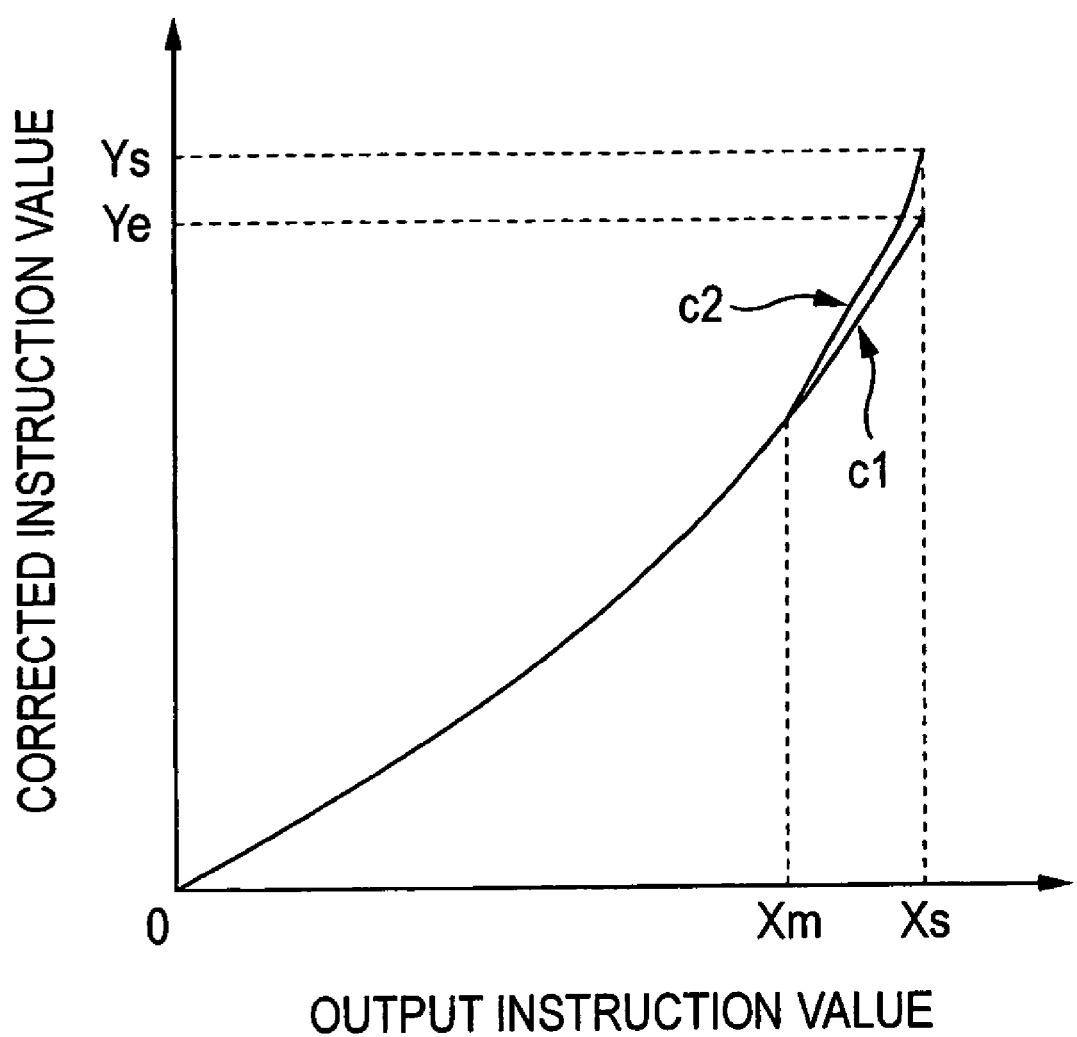
FIG. 3 is a schematic graph showing an exemplary gradation correction curve before a correction and an exemplary gradation correction curve after the correction.
Figure 4A:
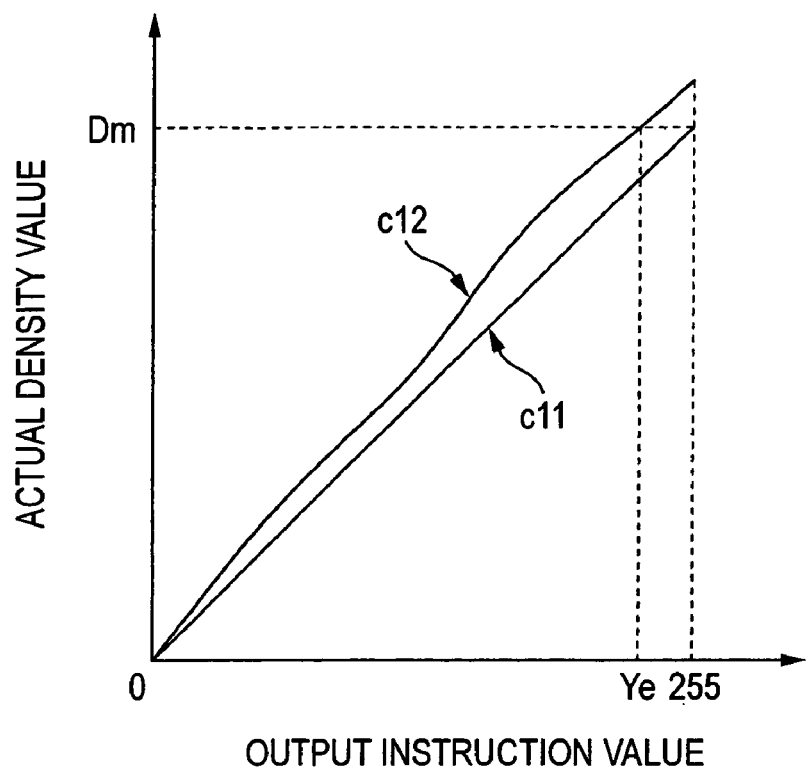
FIGS. 4A and 4B are schematic graphs showing a correlation between an output instruction value and an actual density value, and an exemplary gradation correction curve.
Figure 4B:
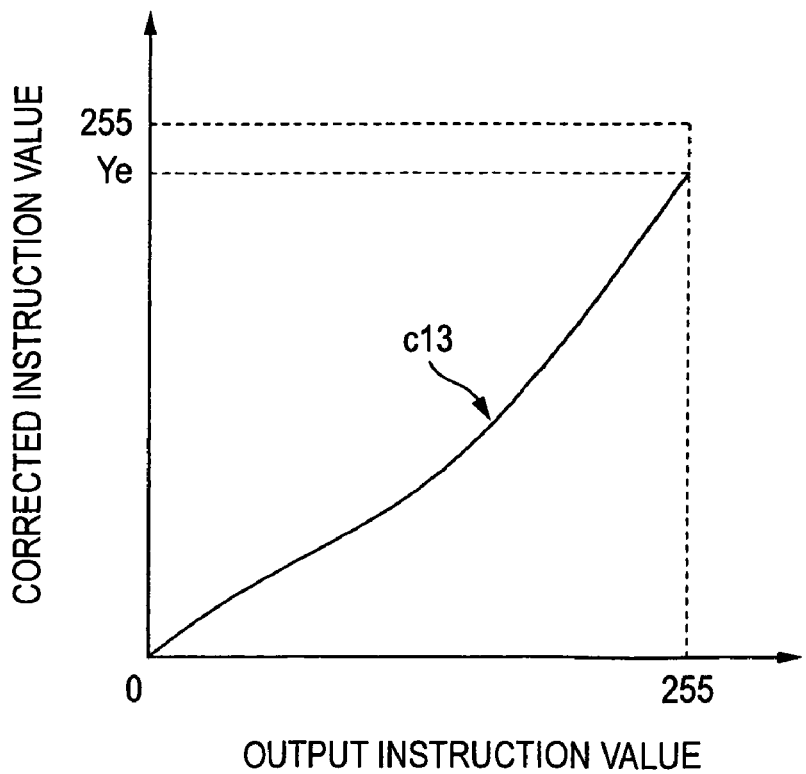

For example, the controller 11 generates a gradation correction curve like the curve C1 in FIG. 3. In the graph shown in FIG. 3, the horizontal axis represents the output instruction value in accordance with the standard density value, the vertical axis represents the output instruction value for reproducing the standard density value at the time at which the data at S1 were obtained. Both these output instruction values fall within a value range of 0 to 255. Then, during the gradation correction process, while the horizontal axis in the graph in FIG. 3 is employed as the input value and the vertical axis is employed as the output value, the output instruction value is converted into a corrected output instruction value. In the following explanation, the maximum output instruction value, which in the gradation correction process is an input value, is defined as the maximum output instruction value Xs, and the maximum available output instruction value, which in the gradation correction process is an output value, is defined as the maximum output instruction value Ys. In the above example, Xs=Ys=255.

Next, the controller 11 determines whether or not the output instruction value Ye for reproducing the maximum standard density value is smaller than the maximum output instruction value Ys (S3). In the example in FIG. 3, the output instruction value Ye corresponding to the maximum standard density value is Ye<Ys, i.e., the condition is established.

When, during the process at S3, the controller 11 determines that the output instruction value Ye for reproducing the maximum standard density value is smaller than the maximum output instruction value, the controller 11 corrects the gradation correction curve (S4). Specifically, the controller 11 corrects the gradation correction curve for the maximum output instruction value Xs, so that a corrected output instruction value obtained during the gradation correction process coincides with the maximum output instruction value Ys. Through this correction, the curve C1 in the example in FIG. 3 is corrected to the curve C2 in FIG. 3. Several examples of the correction process employed for the gradation correction curve in the process at S4 will be described later.

When, during the process at S3, the controller 11 determines that the output instruction value Ye is equal to or greater than Ys, i.e., when, in the state of the image forming apparatus 20 after the process at S1 has been completed, the maximum standard density value can not be reproduced, or when image forming must be performed using the maximum output instruction value in order to reproduce the maximum density value, the controller 11 advances to the next process without correcting the gradation correction curve.

Based on the gradation correction curve generated during the process at S2, or the gradation correction curve generated during the process at S4, the controller 11 generates calibration data in order to correlate the output instruction value with the corrected instruction value (S5). The generated calibration data are then stored in the storage 12, for example, so that they can be employed later for the gradation correction process.

When calibration data have been generated during the above described processing, regardless of the print engine characteristic of the image forming apparatus 20 at the time S1 was performed, the controller 11 can generate calibration data so as to consistently convert the maximum output instruction value Xs into the maximum output value Ys. As a result, when an image that includes an input value consonant with the maximum standard density value is formed, an image can be formed that has the texture intended by a user.

The process at S4 for correcting the gradation correction curve will now be described in detail. At this time, a gradation correction curve before correction, like the curve C1 in FIG. 3, is defined as function $y=L_0(x)$, and a gradation correction curve after correction, like the curve C2 in FIG. 3, is defined as function $y=L(x)$. Both x and y are output instruction values, and x corresponds to an input value in the gradation correction process, while y corresponds to an output value. In this case, the output instruction value Ye corresponding to the maximum standard density value is represented by $Ye=L_0(Xs)$.

As an example, based on a predetermined condition, the controller 11 determines an adjustment start value Xm. Further, the controller 11 determines $y=L(x)$, so that when the output instruction value x is in a range smaller than the adjustment start value Xm, the gradation correction curve $y=L_0(x)$ is employed without being corrected, and when the output instruction value x is in a range equal to or greater than the adjustment start value Xm, the gradation correction curve $y=L_0(x)$ is corrected. Specifically, the controller 11 corrects the gradation correction curve by using the function $L(x)$ represented by the following expression.

[Expression 1]

$$\begin{cases} L(x) = L_0(x) & (x < X_m) \\ L(x) = L_0(x) + D(x) & (x \geq X_m) \end{cases}$$

wherein Xm satisfies $0 \leq Xm < Xs$, and $D(x)$ is a function that satisfies $D(Xm)=0$, $D(Xs)=Ys-Ye$.

When the above function $L(x)$ is employed, the controller 11 does not correct the gradation correction curve in the area wherein is the input value of $0 \leq x \leq Xm$, and corrects an output value relative only to an input value that is greater than the adjustment start value Xm. Thus, for image forming, the image forming control apparatus 10 exactly reproduces the standard density for the image area that includes the input value from the low density to the middle density, and issues the maximum output instruction value for the image area that includes the input value corresponding to the maximum standard density value.

Several examples for determining the adjustment start value Xm will now be explained.

As a first example, the controller 11 may determine, based on the output instruction value Ye, the adjustment start value Xm, for reproducing the maximum standard density value and the maximum output instruction value Ys. Specifically, the controller 11 determines the adjustment start value Xm using a calculation expression $Xm=Xs-F(Ys-Ye)$, wherein $F(X)$ is a predetermined function, and may, for example, be $F(X)=aX$, and a is a predetermined coefficient. As an example, when Ye=215 and a=1.5, Xm=255−1.5×(255−215)=195. It should be noted that there is a case where, when the coefficient a is adjusted and is equal to or greater than two to equal to or smaller than 5, in particular, to about three, an image having an especially natural gradation can be formed.

A function represented by $F(x)=b \cdot \sin(k \cdot X)$ may be employed, wherein b and k are predetermined coefficients.

Further, the function $F(x)$ may become a predetermined fixed value when X exceeds a predetermined limiting value Xq. By using such an $F(X)$, the adjustment start value Xm can be prevented from becoming smaller than a predetermined value when there is a difference between the output instruction values Ys and Ye, i.e., when the output instruction value for reproducing the maximum standard density value deviates greatly from the maximum output instruction value. Therefore, for an image area that has a constant input value up to the middle density, the gradation correction curve can be corrected, so that the standard density can be steadily reproduced.

As a second example for determining the adjustment start value Xm, the controller 11 may determine the adjustment start value Xm, based on a change in the inclination of gradation correction curve $y=L_0(x)$, within the range of a predetermined output instruction value x. Specifically, within a predetermined range for x, the controller 11 determines, to be the adjustment start value Xm, an output instruction value x such that second derivative $y=L_0''(x)$ of $y=L_0(x)$ is a negative value, and the absolute value of $L_0''(x)$, which indicates the change of the inclination of $y=L_0(x)$, is the maximum. When second derivative $y=L_0''(x)$ of $y=L_0(x)$ is a negative value, $y=L_0(x)$ is represented by an upward convex graph.

In this case, the predetermined range available for the adjustment start value Xm is determined so that $X1 \leq Xm \leq X2$ is satisfied, wherein $X1=Xs-F1(Ys-Ye)$ and $X2=Xs-F2(Ys-Ye)$. At this time, $F1(X)$ and $F2(X)$ are predetermined functions. When the adjustment start value Xm is determined in this manner, the adjustment start value is a point where the curvature of the function $y=L_0(x)$ is the greatest within the predetermined range of x. By correcting the gradation correction curve using the adjustment start Xm, the increase of the change in $y=L(x)$, near the adjustment start value Xm, can be prevented. And a gradation correction curve can be obtained where the area of the output instruction value, for enabling the reproduction of the standard density value, is naturally shifted to the area of the output instruction value where a difference from the standard density value occurs.

Further, a case wherein $y=L_0(x)$ is always represented by a downward convex graph in the range represented by $X1 \leq Xm \leq X2$, or a case where there is no range of x where the change in the inclination is equal to or greater than a predetermined value, the controller 11 may determine the adjustment start value by using expression $Xm=(X1+X2)/2$.

Further, the controller 11 employs a monotone increasing function $D(x)$ in the range $Xm \leq x \leq Xs$, for example, to correct the gradation correction curve. As an example, the controller 11 employs the following function as $D(x)$.

[Expression 2]

$$D(x) = \frac{Y_s - Y_e}{X_s - X_m}(x - X_m)$$

The controller 11 may use as $D(x)$ a function for which, at the least, either $D'(Xm)$ or $D'(Xs)$ is a predetermined value or smaller. At this time, $D'(x)$ is the first derivative of $D(x)$, and since $D(x)$, which satisfies $D'(Xm)=0$ or $D'(Xm)<\epsilon1$ ($\epsilon1$ is a predetermined constant)), is employed, the inclination of the corrected gradation correction curve can be prevented from suddenly fluctuating near the adjustment start value Xm. Further, since $D(x)$, which satisfies $D'(Xs)=0$ or $D'(Xm)<\epsilon2$ ($\epsilon2$ is a predetermined constant)), is employed, the inclination of the corrected gradation correction curve can match the inclination of the gradation correction curve $y=L(x)$, before correction near the maximum output instruction value Xs. Therefore, in the image area including the input value that is near the input value of image data corresponding to the maximum standard density value, an image can be formed for which a gradation can be naturally reproduced.

As a function that satisfies these conditions, the controller 11 may employ the following function as $D(x)$.

[Expression 3]

$$D(x) = \frac{1}{2}(Y_s - Y_e)\left(1 - \cos\left(\Pi \cdot \frac{x - X_m}{X_s - X_m}\right)\right)$$

The controller 11 performs a correction for the gradation correction curve using $L(x)$, which is determined in the above explained examples. The controller 11 may appropriately employ together various of the above described conditions, and may determine that the function $L(x)$ is to be used to correct the gradation correction curve.

According to this embodiment, during the gradation correction process, the image forming control apparatus 10 performs gradation correction so that the output instruction value corresponding to the maximum standard density value becomes the maximum output instruction value. Thus, during a process for forming an image that includes the input value of image data corresponding to the maximum standard density value, the image forming apparatus is permitted to form an image as a user's intend.

Additional examples for gradation correction curve $y=L(x)$, which is obtained by the correction, will now be explained. According to one of these examples, the corrected gradation correction curve $y=L(x)$ may be so determined that when $x<Xm$, a value along the original gradation correction value $y=L_0(x)$ is employed unchanged, and within the range represented by $Xm \leq x \leq Xs$, a value is employed along a line connecting a point (Xm, Ym) and a point (Xs, Ys). In this case, $Ym=L_0(Xm)$, and according to the first example for determining the adjustment start value Xm, when Ye=240 and a=3, $Xm=255-3\times(255-240)=210$. And in this case, in the area for x, from 210 to 255, the gradation correction curve $y=L(x)$, obtained by the correction, is a linear line that connects point (210, $L_0(210)$) and point (255, 255).

According to one more example, in a case where image data used for image forming include, as output instruction values x, only data for a range described by $x \leq Xm$ and data for a range described by $Ye \leq x \leq Xs$, i.e., a case where a pixel value corresponding to the output instruction value x, which satisfies $Xm<x<Ye$, is not included in image data when $x \leq Xm$ is satisfied, gradation correction may be performed using the original gradation correction curve $y=L_0(x)$. Within an area for $x>Xm$, gradation correction may not be performed, and the output instruction value x may be output as a corrected output instruction value y. That is, in the area for $x>Xm$, $y=x$ is employed as a gradation correction curve obtained by correction. Thus, a 100% output is guaranteed for the maximum output instruction value Xs (255), and for the area for $x>Xm$, the calculation amount required for the gradation correction process can be reduced. Compared with when gradation correction is performed for an entire area, the load imposed by the gradation correction process can be reduced.

In the above description, the image forming control apparatus 10 has performed a gradation correction process for employing the color conversion profile to convert the input values for image data into the output instruction values corresponding to the standard density values, and then for employing the calibration data to convert the output instruction values into the corrected instruction values. This process sequence, however, may be reversed. In this case, the calibration data constitutes a table for converting the input values of image data into corrected input values that corresponds to the state of the image forming apparatus 20, and the color conversion profile is used to convert the corrected input values into output instruction values for the image forming apparatus 20. Also, in this mode, the controller 11 can perform a correction for the gradation correction curve in the same manner as described above.

Further, in the above explanation, the output instruction value corresponding to the density of a single color has been corrected during the gradation correction process. However, the image forming control apparatus 20 may correct each of the gradation correction curves respectively generated for the CMYK color components. Further, correction for the gradation correction curves may not be performed for the colors CMY, and may only be performed for the color K. Either this, or correction for the gradation correction curves may be performed for the colors CMY, and not for the color K. The foregoing description of the embodiments of the present invention has been provided for the purpose of illustration and description. It is not intended to be exhaustive or limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image forming control apparatus that performs gradation correction process to adjust a density of an image formed by the image forming apparatus, the image forming control apparatus comprising:
   a gradation correction curve generator that generates a gradation correction curve based on a correspondence between output instruction values each representing a density of an image to be formed by the image forming apparatus and actual density values each representing a density of the image formed by the image forming apparatus, wherein the gradation correction curve is a curve which represents a relationship between the output instruction values and corrected output instruction values, and the output instruction values are corrected to the corrected output instruction values by the gradation correction curve; and
   a calibration data generator that, when the corrected output instruction value corresponding to a maximum value of the output instruction values is smaller than the maximum value of the output instruction values in the gradation correction curve, corrects the gradation correction curve so that the corrected output instruction value corresponding to the maximum value of the output instruction values coincides with the maximum value of the output instruction values, and generates the calibration data based on the corrected gradation correction curve.

2. The image forming control apparatus according to claim 1,
   wherein the calibration data generator does not correct the gradation correction curve in a part where the output instruction values are within a range smaller than an adjustment start value, and
   wherein the calibration data generator corrects the gradation correction curve in a part where the output instruction values are within a range equal to or greater than an adjustment start value.

3. The image forming control apparatus according to claim 2, wherein the calibration data generator determines the adjustment start value based on the corrected output instruction value corresponding to the maximum value of the output instruction values and the maximum value of the output instruction values.

4. The image forming control apparatus according to claim 2, wherein the calibration data generator determines the adjustment start value based on a change of an inclination of the gradation correction curve within a predetermined range of the output instruction values.

5. The image forming control apparatus according to claim 2,
   wherein the calibration data generator corrects the gradation correction curve to be expressed as a function $L(x)$ that satisfies Expression (1) as shown below:

$$\begin{cases} L(x) = L_0(x) & (x < X_m) \\ L(x) = L_0(x) + D(x) & (x \geq X_m) \end{cases} \quad \text{Expression (1)}$$

wherein $$D(x) = \frac{Y_s - Y_e}{X_s - X_m}(x - X_m),$$

and
   wherein x denotes the output instruction value, $L_0(x)$ denotes the gradation correction curve, Xm denotes the adjustment start value, Ye denotes the corrected output instruction value corresponding to the maximum value of the output instruction values and Xs and Ys denote the maximum values of the output instruction values.

6. The image forming control apparatus according to claim 1,
   wherein the calibration data generator corrects the gradation correction curve to be expressed as a function $L(x)$ that satisfies Expression (1) as shown below:

$$\begin{cases} L(x) = L_0(x) & (x < X_m) \\ L(x) = L_0(x) + D(x) & (x \geq X_m) \end{cases} \quad \text{Expression (1)}$$

wherein $$D(x) = \frac{Y_s - Y_e}{X_s - X_m}(x - X_m),$$

and
   wherein x denotes the output instruction value, $L_0(x)$ denotes the gradation correction curve, Xm denotes the adjustment start value, Ye denotes the corrected output instruction value corresponding to the maximum value of the output instruction values and Xs and Ys denote the maximum values of the output instruction values.

7. The image forming control apparatus according to claim 1, wherein when the corrected output instruction value corresponding to the maximum value of the output instruction values is smaller than the maximum value of the output instruction values, the gradation correction curve is corrected so as to increase the corrected output instruction value such that the corrected output instruction value becomes substantially the same as the maximum value of the output instruction values.

8. The image forming control apparatus according to claim 1, wherein the calibration data generator determines the adjustment start value based on the corrected output instruction value corresponding to the maximum value of the output instruction values and the maximum value of the output instruction values.

9. The image forming control apparatus according to claim 1, wherein the calibration data generator determines the adjustment start value based on a change of an inclination of the gradation correction curve within a predetermined range of the output instruction values.

10. An image forming control method employing a computer to perform a gradation correction process, the image forming control method comprising:
    generating a gradation correction curve based on a correspondence between output instruction values each representing a density of an image to be formed by the image forming apparatus and actual density values each representing a density of the image formed by the image forming apparatus, wherein the gradation correction curve is a curve which represents a relationship between the output instruction values and corrected output instruction values, and the output instruction values are corrected to the corrected output instruction values by the gradation correction curve; and when the corrected output instruction value corresponding to a maximum value of the output instruction values is smaller than the maximum value of the output instruction values in the gradation correction curve, correcting the gradation correction curve so that the corrected output instruction value corresponding to the maximum value of the output instruction values coincides with the maximum value of the output instruction values, and generating the calibration data based on the corrected gradation correction curve.

11. The image forming control method according to claim 10, wherein when the corrected output instruction value corresponding to the maximum value of the output instruction values is smaller than the maximum value of the output instruction values, the gradation correction curve is corrected so as to increase the corrected output instruction value such that the corrected output instruction value becomes substantially the same as the maximum value of the output instruction values.

12. A computer readable medium storing a program causing a computer to execute a process for performing a gradation correction process, the process comprising:

generating a gradation correction curve based on a correspondence between output instruction values each representing a density of an image to be formed by an image forming apparatus and actual density values each representing a density of the image formed by the image forming apparatus, wherein the gradation correction curve is a curve which represents a relationship between the output instruction values and corrected output instruction values, and the output instruction values are corrected to the corrected output instruction values by the gradation correction curve; and when the corrected output instruction value corresponding to a maximum value of the output instruction values is smaller than the maximum value of the output instruction values in the gradation correction curve, correcting the gradation correction curve so that the corrected output instruction value corresponding to the maximum value of the output instruction values coincides with the maximum value of the output instruction values, and generating the calibration data based on the corrected gradation correction curve.

13. The computer readable medium according to claim 12, wherein when the corrected output instruction value corresponding to the maximum value of the output instruction values is smaller than the maximum value of the output instruction values, the gradation correction curve is corrected so as to increase the corrected output instruction value such that the corrected output instruction value becomes substantially the same as the maximum value of the output instruction values.

* * * * *